(12) United States Patent
Daly (10) Patent No.: US 10,003,252 B2
(45) Date of Patent: Jun. 19, 2018

(54) OVER-CURRENT RECOVERY INCLUDING OVERSHOOT SUPPRESSION

(71) Applicant: Analog Devices, Inc., Norwood, MA (US)

(72) Inventor: Michael Daly, San Jose, CA (US)

(73) Assignee: Analog Devices, Inc., Norwood, MA (US)

(*) Notice: Subject to any disclaimer, the term of this patent is extended or adjusted under 35 U.S.C. 154(b) by 0 days. days.

(21) Appl. No.: 15/149,450

(22) Filed: May 9, 2016

(65) Prior Publication Data
US 2016/0329807 A1 Nov. 10, 2016

Related U.S. Application Data

(60) Provisional application No. 62/158,621, filed on May 8, 2015.

(51) Int. Cl.
*H02M 3/156* (2006.01)
*H02M 1/32* (2007.01)
(Continued)

(52) U.S. Cl.
CPC .............. *H02M 1/36* (2013.01); *H02M 1/32* (2013.01); *H02M 3/156* (2013.01); *H02M 2001/0025* (2013.01); *H02M 2003/1566* (2013.01)

(58) Field of Classification Search
CPC .. H02M 1/36; H02M 1/32; H02M 2003/1566; H02M 2001/009; H02M 1/08;
(Continued)

(56) References Cited

U.S. PATENT DOCUMENTS 5,917,313 A 6/1999 Callahan, Jr.
6,377,480 B1 4/2002 Sase et al.
(Continued)

FOREIGN PATENT DOCUMENTS

CN 101119069 A 2/2008
CN 102403887 A 4/2012
(Continued)

OTHER PUBLICATIONS

"20 V, 1.2 MHz Step-up DC-to-DC Switching Converter", Analog Devices—ADP1611, (2005), 20 pgs.
(Continued)

*Primary Examiner* — Gustavo Rosario Benitez
(74) *Attorney, Agent, or Firm* — Schwegman Lundberg & Woessner, P.A.

(57) ABSTRACT

A power converter circuit can be operated in a constant-current mode when a monitored output current exceeds a specified over-current threshold. A value representing an output voltage of the power converter circuit can be compared to a soft-start voltage reference value. The soft-start voltage reference value can be set (or reset) to a value representing the output voltage of the power converter when the difference between the soft-start voltage reference value and the value representing the output voltage of the power converter is greater than a specified threshold. The output voltage of the power converter can be regulated using the soft-start voltage reference value as a target voltage including ramping the soft-start voltage reference value at specified rate to maintain the soft-start voltage reference value within a specified range of a specified regulated output voltage value, such as to constrain a slew rate of the regulated output voltage.

20 Claims, 5 Drawing Sheets

(51) Int. Cl.
*H02M 1/36* (2007.01)
*H02M 1/00* (2006.01)

(58) Field of Classification Search
CPC . G05F 1/468; G05F 1/445; G05F 1/45; G05F 1/455; G05F 1/573
See application file for complete search history.

(56) References Cited

U.S. PATENT DOCUMENTS

| | | | | |
|---|---|---|---|---|
| 7,019,507 | B1* | 3/2006 | Dittmer | H02M 1/32 323/271 |
| 8,018,694 | B1* | 9/2011 | Wu | H02M 1/32 361/18 |
| 2004/0008528 | A1* | 1/2004 | Umemoto | H02M 3/1588 363/49 |
| 2007/0223164 | A1* | 9/2007 | Oki | G05F 1/573 361/94 |
| 2009/0278521 | A1* | 11/2009 | Omi | H02M 1/36 323/288 |
| 2010/0164462 | A1 | 7/2010 | Yen et al. | |
| 2010/0201283 | A1* | 8/2010 | Kawata | H05B 33/0818 315/287 |
| 2011/0140678 | A1 | 6/2011 | Yee | |
| 2012/0062198 | A1* | 3/2012 | Takano | G05F 1/565 323/282 |
| 2015/0194888 | A1* | 7/2015 | Kasai | H02M 3/158 323/271 |
| 2015/0244265 | A1* | 8/2015 | Sugahara | H02M 3/156 323/273 |

FOREIGN PATENT DOCUMENTS

| | | |
|---|---|---|
| CN | 102419608 A | 4/2012 |
| CN | 106125810 A | 11/2016 |

OTHER PUBLICATIONS

"Synchronous Buck PWM, Step-Down, DC-to-DC Controller", Analog Devices—ADP1828, (2010), 36 pgs.

"Chinese Application Serial No. 201610302398.3, Office Action dated Mar. 28, 2017", With English Translation, 25 pgs.

* cited by examiner

OVER-CURRENT RECOVERY INCLUDING OVERSHOOT SUPPRESSION

CLAIM OF PRIORITY

This patent application claims benefit of priority of Daly, U.S. Provisional Patent Application No. 62/158,621, titled "OVER-CURRENT RECOVERY INCLUDING OVERSHOOT SUPPRESSION," filed on May 8, 2015, which is hereby incorporated by reference herein in its entirety.

BACKGROUND

A power supply control circuit can be coupled to or included as a portion of a power supply. The power supply can include a direct-current-to-direct-current (DC-DC) converter, and the control circuit can control the converter to provide a regulated output. Generally, the regulated output includes a specified output voltage including specified ripple or noise characteristics. Such output parameters are generally specified over a wide range of conditions including temperature and load. The regulated output can include a specified maximum output current or output power. A variety of topologies can be used to implement regulation, such as can include linear or switched-mode circuits. The power supply control circuit can implement a regulation law using one or more of voltage-mode or current-mode feedback. In one approach, a power controller can include a current limiting circuit. The current limiting circuit can sense one or more of input or output current and can control the behavior of the power controller to limit one or more of the input or output current.

SUMMARY

A power supply control circuit, such as operating in a current-limited mode, may not be able to maintain a specified regulated output voltage. For example, during an over-current condition where an output current demand exceeds a specified over-current threshold, the power supply control circuit can operate a DC-DC converter circuit in a constant-current mode. However, such a constant-current mode can be insufficient to meet a load current demand, and accordingly an output voltage, such as represented by $V_{OUT}$, generally sags below a specified regulated output voltage target (such as can be represented by $V_{REG}$).

When the over-current condition ceases such as when the load current demand falls below the over-current threshold), the DC-DC converter can continue to maintain near constant-current output such as before or during a transition back to voltage-mode operation. During such a transient condition where the load current abruptly decreases, the output voltage, $V_{OUT}$, can rise rapidly such as having a slew rate that may be limited only by characteristics of an output capacitor and a magnitude of a change in load current demand. Accordingly, such a slew rate can be rapid enough to result in an output voltage that overshoots the specified regulated output voltage before the control loop can bring the output voltage into regulation.

The present inventor has recognized, among other things, that such overshoot can be damaging to other circuitry or can result in unwanted noise coupled to other circuitry. In some power supply control circuits, a startup circuit can be included such as can govern a rate at which the output voltage ramps up to regulation such as when the controller is first enabled. The present inventor has recognized, among other things, that such a "soft-start" approach can also be used such as to limit a rate of change in output voltage, such as when a large difference exists between the output voltage and the specified regulated output voltage during or after current-limited supply operation.

In an example, a power converter circuit can be operated in a constant-current mode when a monitored output current exceeds a specified over-current threshold. A value representing an output voltage of the power converter circuit can be compared to a soft-start voltage reference value. The soft-start voltage reference value can be set or reset) to a value representing the output voltage of the power converter when the difference between the soft-start voltage reference value and the value representing the output voltage of the power converter is greater than a specified threshold. The output voltage of the power converter can be regulated using the soft-start voltage reference value as a target voltage including ramping the soft-start voltage reference value at specified rate until the soft-start voltage reference value is within a specified range of a specified regulated output voltage value. The reset of the soft-start voltage can be inhibited when the supply is not operating in a current-limited mode.

This overview is intended to provide an overview of subject matter of the present patent application. It is not intended to provide an exclusive or exhaustive explanation of the invention. The detailed description is included to provide further information about the present patent application.

the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
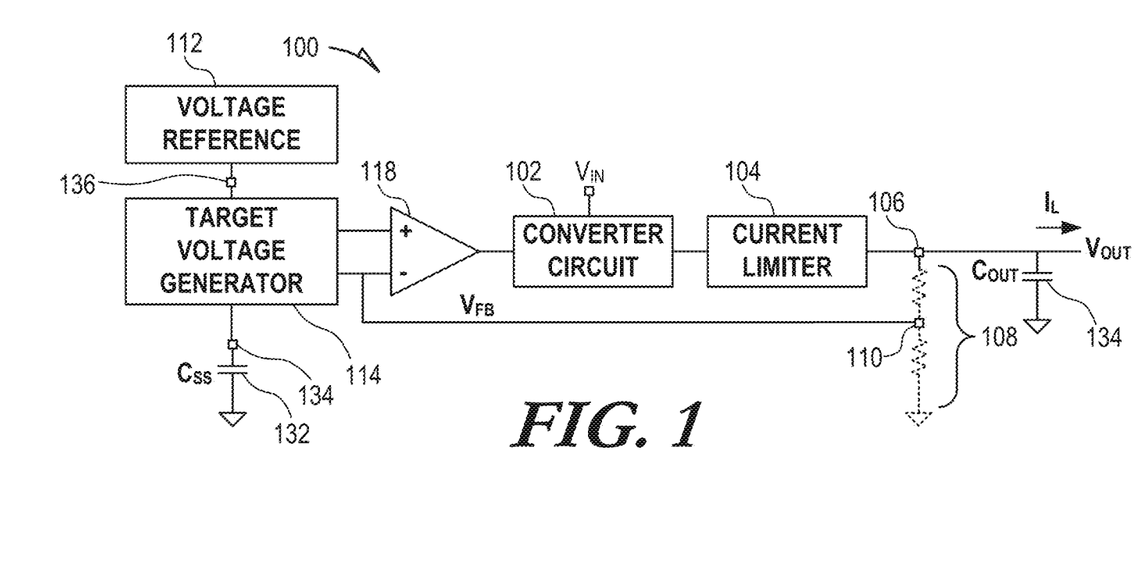
FIG. 1 illustrates generally an example that can include a power supply circuit.

FIG. 1 illustrates generally an example that can include a power supply circuit 100, such as for use in converting a first DC voltage, $V_{IN}$, provided at an input node, to another voltage such as to provide a regulated output voltage, $V_{OUT}$, provided at an output node 106. The power supply circuit 100 can include a converter circuit 102, such as switched-mode converter circuit, such as operating in a buck configuration, boost configuration, or buck-boost configuration. The converter circuit 102 can be coupled to or can include a current limiter circuit 104. In the illustrative example of FIG. 1, the current limiter circuit 104 is shown at the output of the converter circuit 102, but such an example is merely illustrative. The current limiter circuit 104 can be located elsewhere, such as configured to monitor one or more of an input current (such as supplied at the input node) or an output current, such as supplied to the output node 106. The current limiter can be configured to trigger operation of the converter circuit 102 to limit output current to a constant current or otherwise configured to limit an output current provided by the converter circuit 102, such as when a monitored output current exceeds a specified over-current threshold. The converter circuit 102 can be configured to operate in a voltage-mode when the monitored output current is below the specified over-current threshold.

The power supply circuit 100 can include an error amplifier 118 configured to compare a representation of the output voltage, such as a feedback voltage, $V_{FB}$, against a reference voltage, such as a target voltage provided by a target voltage generator circuit 114. For example, the target voltage can be a voltage stored at a soft-start voltage node 134, such as stored using a soft-start capacitor $C_{SS}$ 132. As described in other examples herein, the soft-start capacitor $C_{SS}$ 132 can be charged using a constant-current source until $C_{SS}$ reaches a specified regulator output voltage target value. The specified regulator output voltage target value can be derived from a reference voltage provided at a reference voltage node 136, such as generated by or derived from a voltage reference 112.

The voltage reference 112 can include a bandgap reference or other voltage reference, as an illustrative example. As described in various examples below, a soft-start voltage reference value (such as a voltage at the node 134) can be set (or reset) to a value at or near the output voltage of the power converter (e.g., $V_{OUT}$ or $V_{FB}$) when a difference between the soft-start voltage reference value and the value representing the output voltage of the power converter is greater than a specified threshold. For example, the soft-start voltage reference value can be set to a value greater in magnitude than the $V_{OUT}$ or $V_{FB}$ value. In this manner, the power supply circuit will maintain an output at or near a current limit value (such as a current limit value provided by the current limiter circuit 104). By contrast, if a soft-start reference value that is lower than the $V_{OUT}$ or $V_{FB}$ value is used, the power supply circuit 100 would attempt to revert to normal (e.g., voltage-mode) operation, and would then toggle repeatedly between current-limited operation and normal operation, possibly (or even likely) providing an output current $I_L$ that is less than the current limit value.

The output voltage of the converter circuit 102 can be regulated using the soft-start voltage reference value as a target voltage including ramping the soft-start voltage reference value at specified rate until the soft-start voltage reference value is within a specified range of a specified regulated output voltage value, such as to suppress or inhibit overshoot in output voltage when load current demand decreases abruptly.

Figure 2:
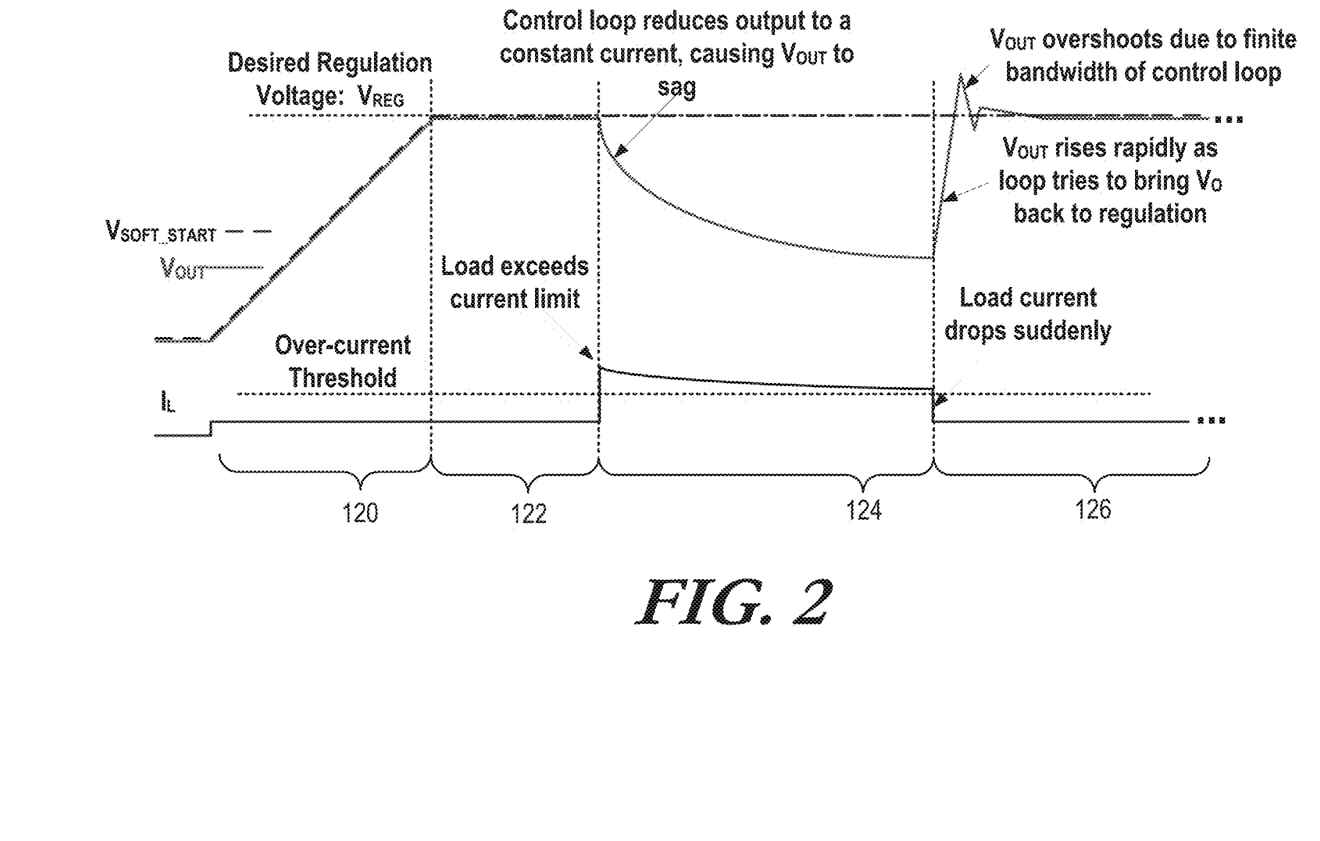
FIG. 2 illustrates generally an illustrative example showing an overshoot condition that can occur when a load current changes abruptly.

FIG. 2 illustrates generally an illustrative example showing an overshoot condition that can occur when a load current changes abruptly at 126. A power supply circuit can include a startup circuit that can govern a rate at which an output voltage (e.g., $V_{PUT}$) ramps up to specified regulated output voltage (e.g., $V_{REG}$) when the power supply is enabled or switched on. Such controlled ramping behavior can be referred to as "soft-start," and can be implemented such as using a constant current injected into a capacitor to generate a ramping voltage, which can be referred to as a soft-start voltage reference (e.g., $V_{SOFT\_START}$), having a desired slew rate such that if used as target voltage for a converter circuit, the converter circuit will not overshoot the specified regulated output voltage, $V_{REG}$, during startup, such as shown at 120.

If the load current (e.g., $I_L$) remains below a specified over-current threshold, such as at 122, the converter circuit can provide a regulated output voltage within a specified range of the desired output voltage, $V_{REG}$. At 124, the output current, $I_L$, can exceed the over-current threshold (corresponding to an abrupt change in load). During such an interval, the output voltage can sag because an output current of the converter circuit can be limited to a constant value, such as a value at or near the specified over-current threshold. Such sagging output voltage can correspond to a transition in converter regulation from voltage-mode regulation to current-mode regulation. In FIG. 2, the load current is shown as exceeding the over-current threshold and gradually decreasing. This behavior is expected because even if the output current of the converter circuit is limited and held generally constant, such as during current-mode operation, additional current can be supplied (at least temporarily) by an output capacitor coupled to an output node of the converter circuit. The intervals shown in FIG. 2 are illustrative and not necessarily drawn to scale. For example, at 122, stable operation could extend for a long period of time before the load current exceeds the specified over-current threshold.

At 126, the load current can decrease abruptly. The present inventors have recognized, among other things, that in the absence of the subject matter of the present teachings such as the target voltage generator circuit, an output voltage, \Tour, can rapidly increase and can even significantly overshoot the specified regulated output voltage, $V_{REG}$, during recovery from current-limited operation. This can occur before or during a duration where the converter circuit transitions from constant-current operation to voltage-mode operation, for example. A bandwidth of a voltage regulation control loop provided by the converter circuit for voltage-mode regulation may be insufficient to suppress such overshoot. For example, in a converter configuration including an inductor as an energy storage element, a current supplied by or sunk by the inductor cannot change instantaneously. Accordingly, such overshoot can induce damage or noise in other circuitry, such as circuitry supplied by the power supply circuit.

Figure 3A:
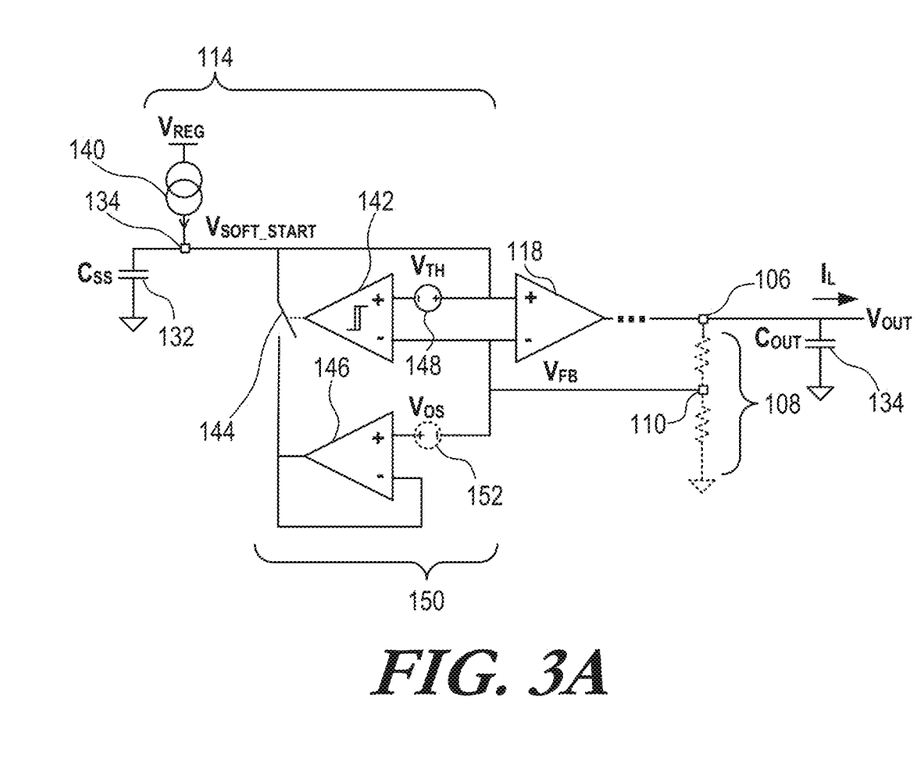
FIG. 3A illustrates generally an example that can include a power supply circuit comprising a soft-start reference reset circuit.

FIG. 3A illustrates generally an example that can include a power supply circuit comprising a soft-start reference reset circuit 150, such as can be included as a portion of target voltage generator 114. In the illustrative example of FIG. 3A, an error amplifier 118 can provide an output signal, such as can be used by a converter circuit to generate a regulated output voltage, $V_{OUT}$, at an output node 106. The inputs of the error amplifier 118 can be coupled to a target voltage node, such as a soft-start reference voltage node 134, $V_{SOFT\_START}$, and to a node $V_{FB}$, carrying a representation of the output voltage $V_{OUT}$ at the output node 106. As another example, such as if no resistor divider 108 is used, the error amplifier 118 can have an input coupled directly to the output node 106 (or to a buffered representation thereof).

The soft-start reference voltage. $V_{SOFT\_START}$, can be established using a current source 140 configured to inject a current into a soft-start storage capacitor $C_{SS}$ 132. This can establish a ramping voltage waveform having a specified ramp-rate, at the $V_{SOFT\_START}$ reference node 134. The current source 140 can be configured to supply current such as until the $V_{SOFT\_START}$ reference node 134 reaches a specified regulated output voltage value, $V_{REG}$ (or a value representative of the regulated output voltage value). In one approach, the soft-start voltage reference value stored at the $V_{SOFT\_START}$ reference node 134 can remain generally constant after startup. However, the present inventors have recognized that the voltage overshoot behavior mentioned above in relation to FIG. 2 can be suppressed or inhibited such as by using the soft-start reference reset circuit 150. The soft-start reference reset circuit can compare a representation of the output voltage, such as $V_{FB}$ at a feedback node 110, to the soft-start reference voltage, $V_{SOFT\_START}$, at the node 134, using a comparator 142 such as including offsetting one of $V_{SOFT\_START}$ or the representation of the output voltage by a specified threshold value, $V_{TH}$, such as can be established using a voltage source 148. In an illustrative example, if $V_{SOFT\_START}$ exceeds the value of the representation of the output voltage by more than the specified threshold, $V_{TH}$, a switch 144 (e.g., a transistor, transmission gate, or other circuit) can be closed and a high-current buffer circuit 146 can be used to drive the soft-start reference node 134 to a value at or near the feedback voltage, $V_{FB}$ (or to a value at or near the output voltage $V_{OUT}$ if no feedback divider is used). In this manner, a magnitude of $V_{SOFT\_START}$ will always be at or greater than a magnitude of $V_{FB}$. Optionally, in an example, $V_{SOFT\_START}$ can be established to remain greater in magnitude than $V_{FB}$ such as by adding an offset voltage to $V_{FB}$, such as using a voltage source 152 $V_{OS}$. In such an example, when $V_{SOFT\_START}$ is reset, $V_{SOFT\_START}$ will be established at a value $V_{FB}+V_{OS}$, and is then always greater in magnitude than $V_{FB}$ (or $V_{OUT}$ if no feedback divider is used).

Operation of the reset circuit 150 can be inhibited such as in an absence of an over-current indication. For example, outputs of one or more of the comparator 142 or high-current buffer 146 can be gated, such as to suppress reset behavior when no over-current condition exists. In another example, one or more of the comparator 142 or high-current buffer 146 could be depowered or otherwise disabled in the absence of an over-current condition. In this manner, the soft-start voltage reference need not be reset in the absence of current-limited supply operation.

The output node 106, feedback node 110, and soft-start reference voltage node 134 can each comprise a pin on an integrated circuit. For example, the soft-start voltage capacitor 132 and output capacitor 134 can be located off-chip, or even externally to an integrated circuit or module package comprising other circuitry. Operation of a power supply circuit such as can include the soft-start reference reset circuit 150 is shown illustratively in FIG. 3B.

Figure 3B:
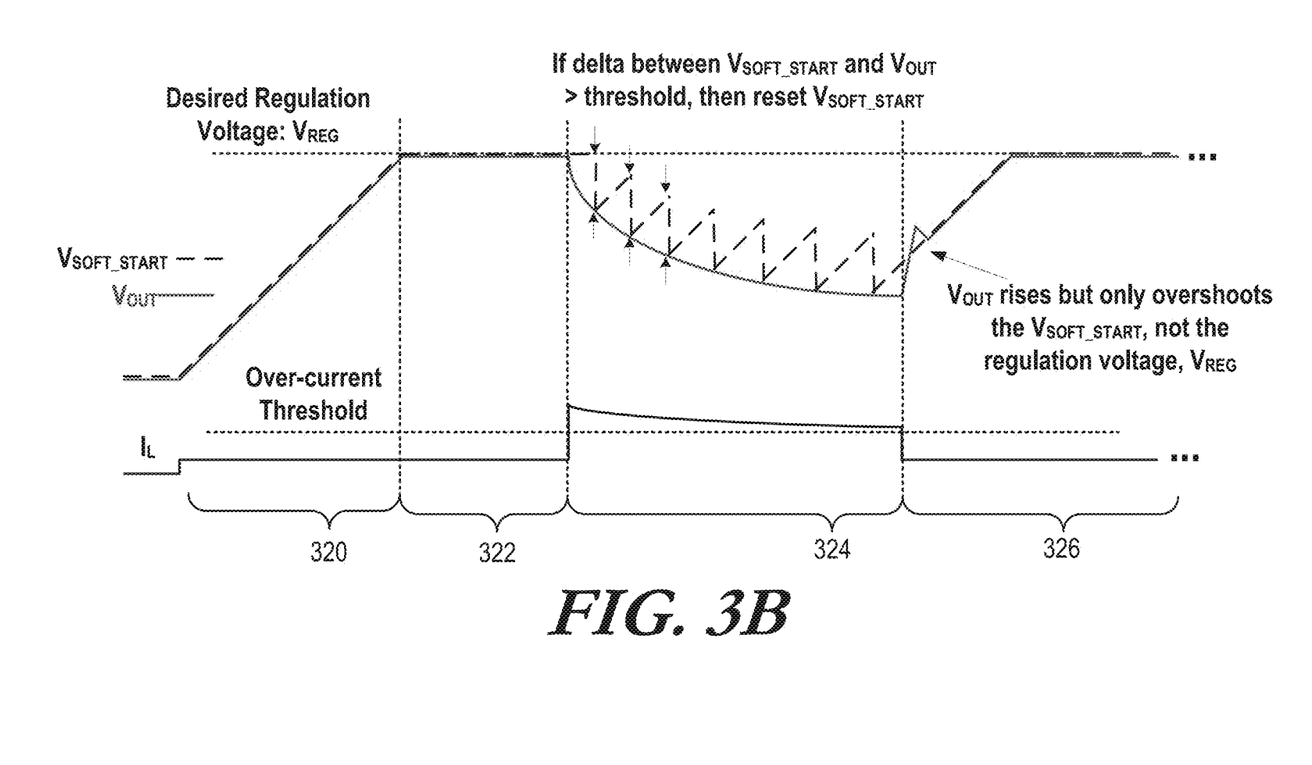
FIG. 3B illustrates generally an illustrative example showing suppression of an overshoot condition, such as can be achieved using the soft-start reference reset circuit shown in FIG. 3A.

FIG. 3B illustrates generally an illustrative example showing suppression of an overshoot condition, such as can be achieved using the soft-start reference reset circuit 150 shown in FIG. 3A. As in FIG. 2, at 320 an output voltage, $V_{OUT}$, can ramp up to a specified regulated output voltage, $V_{REG}$, such as at a specified ramp-rate established at least in part using a soft-start voltage reference. At 322, the output voltage $V_{OUT}$ can remain within a specified range. As in FIG. 2, at 324, the output voltage $V_{PUT}$ can sag below the desired output regulation voltage $V_{REG}$, such as because a power supply circuit can be operated in a constant-current mode when the load current demand causes an output current to exceed a specified over-current threshold. By contrast with the example of FIG. 2, in FIG. 3B at 324, the soft-start voltage, $V_{SOFT\_START}$, can be reset, such as when a difference (e.g. a delta) between $V_{SOFT\_START}$ and $V_{OUT}$ (or a representation of $V_{OUT}$ such as $V_{FB}$) exceeds a specified threshold (e.g., $V_{TH}$).

After a reset, $V_{SOFT\_START}$ will ramp up at a specified ramp-rate. If the over-current condition persists, $V_{SOFT\_START}$ will be reset repeatedly as shown at 324 because $V_{SOFT\_START}$ will ramp away from (and will be greater in magnitude than) the output voltage $V_{OUT}$ after each reset. As the output voltage $V_{OUT}$ continues to sag, when the power supply circuit is maintained in a constant-current output mode, $V_{SOFT\_START}$ can roughly track the sagging output voltage $V_{OUT}$ by undergoing a series of reset cycles as shown at 324, instead of remaining fixed at the $V_{REG}$ value. A precision of such tracking can be influenced at least in part by a value of the specified threshold, $V_{TH}$. A specified threshold that is smaller in magnitude will force $V_{SOFT\_START}$ to more closely track $V_{OUT}$, but will also cycle the soft-start voltage reference reset circuit more often as compared to a threshold that is larger in magnitude.

At 326, the load current $I_L$ drops abruptly. The output voltage $V_{OUT}$ will increase abruptly in response. However, unlike the example of FIG. 2, $V_{OUT}$ can be constrained by a specified soft-start ramp-rate, such as a ramp-rate as shown at 320 during initial startup. $V_{OUT}$ may overshoot $V_{SOFT\_START}$ until voltage regulation within the bandwidth of the control loop is established. But, $V_{OUT}$ will generally not overshoot $V_{REG}$ because $V_{SOFT\_START}$ provides a target voltage for regulation that is well below $V_{REG}$. Once close-loop voltage regulation is established, $V_{OUT}$ more slowly ramps to $V_{REG}$ at the ramp-rate established by $V_{SOFT\_START}$. In this manner, overshoot can be suppressed or inhibited by efficiently re-using a soft-start circuit and incorporating a reset feature in the soft-start circuit.

Figure 4:
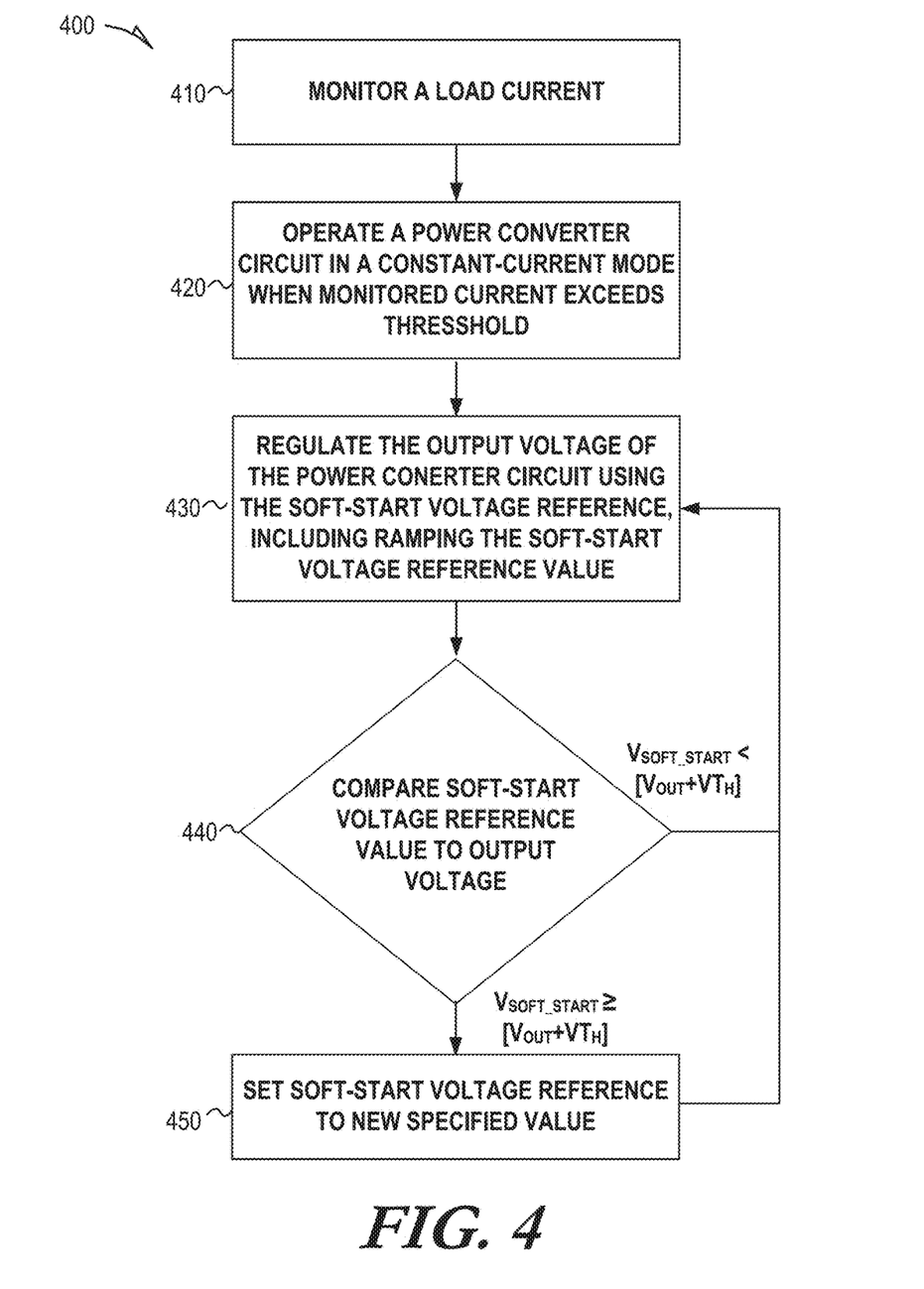
FIG. 4 illustrates generally a technique, such as a method, that can include regulating an output voltage of the power converter using a soft-start voltage reference value as a target voltage.

FIG. 4 illustrates generally a technique 400, such as a method, that can include regulating an output voltage of the power converter using a soft-start voltage reference value as a target voltage. At 410, a load current can be monitored, such as using a load current monitoring circuit. Such load current monitoring can be performed using a variety of techniques. For example, a voltage drop across a structure or device can be monitored, and an impedance or resistance of the device can be used to estimate a current passing through the device. In another example, an electromagnetic sensor such as a current monitoring transformer can be used.

At 420, a power converter circuit can be operated in a constant-current mode when the monitored output current exceeds a specified over-current threshold. The constant-current mode can include or can use circuits or techniques as described elsewhere herein, such as in relation to FIG. 1, FIG. 3A, or FIG. 3B, as illustrative examples. For example, at 430, an output voltage of the power converter circuit can be regulated, such as using a soft-start voltage reference.

For example, the soft-start voltage reference can provide a target voltage, and the power converter circuit can drive an output voltage toward the soft-start reference voltage. The soft-start voltage can be ramped, and the output voltage of the power converter circuit can track the ramping soft-start voltage. At 440, the soft start voltage (e.g., $V_{SOFT\_START}$) can be compared to the output voltage of the power converter circuit ($V_{OUT}$) or a value representative of $V_{OUT}$ (e.g., $V_{FB}$). For example, if $V_{SOFT\_START}$ meets or exceeds a specific threshold (e.g., $V_T$) beyond $V_{OUT}$, then at 450, the soft-start voltage reference can be set to a new specified value (e.g., reset to a value about equal to $V_{OUT}$ $V_{FB}$, or within a specified offset of $V_{OUT}$ or $V_{FB}$, such that $V_{SOFT\_START}$ is maintained at a value greater than $V_{OUT}$ or $V_{FB}$). If $V_{SOFT\_START}$ is within a margin of $V_{TH}$ of a $V_{OUT}$ value or a $V_{FB}$ value, then regulation using a current-limited mode of the power converter can continue using the existing ramping soft-start reference signal, as shown illustratively in FIG. 3A, for example.

VARIOUS NOTES & EXAMPLES

Example 1 can include or use subject matter (such as an apparatus, a method, a means for performing acts, or a device readable medium including instructions that, when performed by the device, can cause the device to perform acts), such as can include or use a method of operating a power converter circuit, comprising monitoring a load current, operating the power converter circuit in a constant-current mode when the monitored output current exceeds a specified over-current threshold, comparing a value representing an output voltage of the power converter circuit to a soft-start voltage reference value, setting the soft-start voltage reference value to the value representing the output voltage of the power converter when the difference between the soft-start voltage reference value and the value representing the output voltage of the power converter is greater than a specified threshold, and regulating the output voltage of the power converter using the soft-start voltage reference value as a target voltage including ramping the soft-start voltage reference value at specified rate to maintain the soft-start voltage reference value within a specified range of a specified regulated output voltage value.

In Example 2, the subject matter of Example 1 optionally includes that the ramping the soft-start voltage reference value includes injecting a constant current into a soft-start capacitor until the soft-start capacitor is charged to a specified reference voltage.

In Example 3, the subject matter of any one or more of Examples 1-2 optionally includes that the setting the soft-start voltage reference value includes comparing the value representing the output voltage of the power converter to the soft-start voltage reference value offset by the specified threshold, and triggering a switching element to couple a buffer circuit between a soft-start voltage reference node and a node carrying a representation of the output voltage of the power converter to force the soft-start voltage reference node to the value representing the output voltage.

In Example 4, the subject matter of any one or more of Examples 1-3 optionally includes that the value representing the output voltage of the power converter comprises a specified proportion of the output voltage.

In Example 5, the subject matter of any one or more of Examples 1-4 optionally includes that the soft-start voltage reference value is maintained at a value greater in magnitude than the value representing the output voltage of the power converter.

In Example 6, the subject matter of any one or more of Examples 1-5 optionally includes operating the power converter circuit in a voltage-regulating mode when the output current is below a specified over-current threshold.

In Example 7, the subject matter of any one or more of Examples 1-6 optionally includes suppressing overshoot of the output voltage beyond the specified regulated output voltage value including limiting the output voltage slew rate to a rate defined by the ramping of the soft-start voltage reference value.

Example 8 can include or use subject matter (such as an apparatus, a method, a means for performing acts, or a device readable medium including instructions that, when performed by the device, can cause the device to perform acts), such as can include or use a power supply control circuit, comprising a target voltage generator circuit, the target voltage generator configured to generate a soft-start voltage reference value including ramping the soft-start voltage reference value at specified rate until the soft-start voltage reference value is within a specified range of a specified regulated output voltage value, an error amplifier coupled to the target voltage generator and configured to receive the soft-start voltage reference value and to provide an error signal to a converter circuit in response to comparing the soft-start voltage reference value to a value representing an output voltage of the power converter, the converter circuit configured to provide a regulated output voltage in response to the error signal, and a current limiter circuit configured to trigger operation of the converter circuit in a constant-current mode in response to an over-current indication, where the target voltage generator circuit is configured to set the soft-start voltage reference value to the value representing the output voltage of the power converter when the difference between the soft-start voltage reference value and the value representing the output voltage of the power converter is greater than a specified threshold.

In Example 9, the subject matter of Example 8 optionally includes a constant current source and a soft-start capacitor, where the target voltage generator circuit is configured to ramp the soft-start voltage reference value by injecting a constant current from the constant current source into the soft-start capacitor until the soft-start capacitor is charged to a specified reference voltage.

In Example 10, the subject matter of any one or more of Examples 8-9 optionally includes that the target voltage generator comprises a first comparator configured to compare the value representing the output voltage of the power converter to the soft-start voltage reference value offset by the specified threshold, a first buffer having an input coupled to a node carrying a representation of the output voltage of the power converter and an output coupleable to a soft-start voltage reference node, and a switch coupled to the output of the first comparator and configured to force the soft-start voltage reference node to the value representing the output voltage when the soft-start voltage reference value exceeds the value representing the output voltage of the power converter by more than the specified threshold.

In Example 11, the subject matter of any one or more of Examples 8-10 optionally includes that the value representing the output voltage of the power converter comprises a specified proportion of the output voltage.

In Example 12, the subject matter of any one or more of Examples 8-11 optionally includes that the soft-start voltage reference value is maintained at a value greater in magnitude than the value representing the output voltage of the power converter.

In Example 13, the subject matter of any one or more of Examples 8-12 optionally include wherein the target voltage generator, error amplifier, and current limiter are co-integrated on a commonly-shared integrated circuit.

Example 1 can include or use subject matter (such as an apparatus, a method, a means for performing acts, or a device readable medium including instructions that, when performed by the device, can cause the device to perform acts), such as can include or use a DC-to-DC power supply circuit, comprising a converter circuit having an input node and an output node, the output node coupleable to an output capacitor, a current limiter circuit configured to trigger operation of the converter circuit in a constant-current mode in response to an over-current indication, a target voltage generator circuit, the target voltage generator configured to generate a soft-start voltage reference value including ramping the soft-start voltage reference value at specified rate to maintain the soft-start voltage reference value within a specified range of a specified regulated output voltage value, an error amplifier coupled to the target voltage generator and configured to receive the soft-start voltage reference value and to provide an error signal to the converter circuit in response to comparing the soft-start voltage reference value to a value representing an output voltage of the power converter, the converter circuit configured to provide a regulated output voltage at the output node in response to the error signal, and the target voltage generator circuit is configured to set the soft-start voltage reference value to the value representing the output voltage of the power converter when the difference between the soft-start voltage reference value and the value representing the output voltage of the power converter is greater than a specified threshold.

In Example 15, the subject matter of Example 14 optionally includes that the power converter circuit is configured to operate in a voltage-regulating mode when the output current is below a specified over-current threshold.

In Example 16, the subject matter of any one or more of Examples 14-15 optionally includes a constant current source and a soft-start capacitor; and wherein the target voltage generator circuit is configured to ramp the soft-start voltage reference value by injecting a constant current from the constant current source into the soft-start capacitor until the soft-start capacitor is charged to a specified reference voltage.

In Example 17, the subject matter of Example 16 optionally includes that the soft-start capacitor is located externally to an integrated circuit comprising the target voltage generator circuit.

In Example 18, the subject matter of any one or more of Examples 14-17 optionally includes an output capacitor coupled to the output node.

In Example 19, the subject matter of Example 18 optionally includes an output capacitor located externally to an integrated circuit comprising one or more of the target voltage generator circuit, the current limiter, or the converter circuit.

In Example 20, the subject matter of any one or more of Examples 14-19 optionally includes that the target voltage generator comprises a first comparator configured to compare the value representing the output voltage of the power converter to the soft-start voltage reference value offset by the specified threshold, a first buffer having an input coupled to a node carrying a representation of the output voltage of the power converter and an output coupleable to a soft-start voltage reference node, and a switch coupled to the output of the first comparator and configured to force the soft-start voltage reference node to the value representing the output voltage when the soft-start voltage reference value exceeds the value representing the output voltage of the power converter by more than the specified threshold.

Each of the non-limiting examples described herein can stand on its own, or can be combined in various permutations or combinations with one or more of the other examples.

The above detailed description includes references to the accompanying drawings, which form apart of the detailed description. The drawings show, by way of illustration, specific embodiments in which the invention can be practiced. These embodiments are also referred to herein as "examples," Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of operating a power converter circuit, comprising:
   monitoring a load current;
   operating the power converter circuit in a constant-current mode when the monitored output current exceeds a specified over-current threshold;
   comparing a value representing an output voltage of the power converter circuit to a soft-start voltage reference value offset by a specified threshold; and
   in response, when the soft-start reference voltage exceeds the value representing the output voltage of the power converter by the specified threshold, forcing the soft-start voltage reference value to the value representing the output voltage of the power converter plus a specified offset, using a buffer circuit; and
   regulating the output voltage of the power converter using the soft-start voltage reference value as a target voltage including ramping the soft-start voltage reference value.

2. The method of claim 1, wherein the ramping the soft-start voltage reference value includes injecting a constant current into a soft-start capacitor until the soft-start capacitor is charged to a specified reference voltage.

3. The method of claim 1, wherein forcing the soft-start voltage reference value
   comprises triggering a switching element to couple the buffer circuit between a soft-start voltage reference node and a node carrying a representation of the output voltage of the power converter plus the specified offset.

4. The method of claim 1, wherein the value representing the output voltage of the power converter comprises a specified proportion of the output voltage.

5. The method of claim 1, wherein the soft-start voltage reference value is maintained at a value greater in magnitude than the value representing the output voltage of the power converter.

6. The method of claim 1, comprising operating the power converter circuit in a voltage-regulating mode when the output current is below a specified over-current threshold.

7. The method of claim 1, comprising suppressing overshoot of the output voltage beyond the specified regulated output voltage value including limiting the output voltage slew rate to a rate defined by the ramping of the soft-start voltage reference value.

8. A power supply control circuit, comprising:
   a target voltage generator circuit, the target voltage generator configured to generate a soft-start voltage reference value including ramping the soft-start voltage reference value; and
   a current limiter circuit configured to trigger operation of a converter circuit in a constant-current mode in response to an over-current indication;
   wherein, in the constant-current mode, the target voltage generator circuit is configured to:
   compare a value representing an output voltage of the power converter circuit to a soft-start voltage reference value offset by a specified threshold; and
   in response, when the soft-start reference voltage exceeds the value representing the output voltage of the power converter by the specified threshold, set the soft-start voltage reference value to the value representing the output voltage of the power converter plus a specified offset, using a buffer circuit configured to force a soft-start voltage reference node to the value representing the output voltage plus the specified offset.

9. The power supply control circuit of claim 8, comprising a constant current source and a soft-start capacitor; and
   wherein the target voltage generator circuit is configured to ramp the soft-start voltage reference value by injecting a constant current from the constant current source into the soft-start capacitor until the soft-start capacitor is charged to a specified reference voltage.

10. The power supply control circuit of claim 8, wherein the target voltage generator comprises:
    a first comparator configured to compare the value representing the output voltage of the power converter to the soft-start voltage reference value offset by the specified threshold;
    and
    a switch coupled to the output of the first comparator and configured to force the soft-start voltage reference node to the value representing the output voltage plus the specified offset, using the buffer circuit.

11. The power supply control circuit of claim 8, wherein the value representing the output voltage of the power converter comprises a specified proportion of the output voltage.

12. The power supply control circuit of claim 8, wherein the soft-start voltage reference value is maintained at a value greater in magnitude than the value representing the output voltage of the power converter.

13. A DC-to-DC power supply circuit, comprising:
    a converter circuit having an input node and an output node, the output node coupleable to an output capacitor;
    a current limiter circuit configured to trigger operation of the converter circuit in a constant-current mode in response to an over-current indication;
    a target voltage generator circuit, the target voltage generator configured to generate a soft-start voltage reference value including ramping the soft-start voltage reference value;
    an error amplifier coupled to the target voltage generator and configured to receive the soft-start voltage reference value and to provide an error signal to the converter circuit in response to comparing the soft-start voltage reference value to a value representing an output voltage of the power converter, the converter circuit configured to provide a regulated output voltage at the output node in response to the error signal; and
    wherein the target voltage generator circuit is configured to:
    compare a value representing an output voltage of the power converter circuit to a soft-start voltage reference value offset by a specified threshold; and
    in response, when the soft-start reference voltage exceeds the value representing the output voltage of the power converter by the specified threshold, set the soft-start voltage reference value to the value representing the output voltage of the power converter plus a specified offset, using a buffer circuit configured to force a soft-start voltage reference node to the value representing the output voltage plus the specified offset.

14. The DC-to-DC power supply circuit of claim 13, wherein the power converter circuit is configured to operate in a voltage-regulating mode when the output current is below a specified over-current threshold.

15. The DC-to-DC power supply circuit of claim 13, comprising a constant current source and a soft-start capacitor; and
    wherein the target voltage generator circuit is configured to ramp the soft-start voltage reference value by injecting a constant current from the constant current source into the soft-start capacitor until the soft-start capacitor is charged to a specified reference voltage.

16. The DC-to-DC power supply circuit of claim 13, further comprising the output capacitor coupled to the output node.

17. The DC-to-DC power supply circuit of claim 13, wherein the target voltage generator comprises:

a first comparator configured to compare the value representing the output voltage of the power converter to the soft-start voltage reference value offset by the specified threshold;

and a switch coupled to the output of the first comparator and configured to force the soft-start voltage reference node to the value representing the output voltage plus the specified offset, using the buffer circuit.

18. The method of claim 1, comprising inhibiting the forcing of the soft-start voltage reference value to the value representing the output voltage of the power converter plus a specified offset when the output current is below a specified over-current threshold.

19. The power supply control circuit of claim 8, wherein the target voltage generator circuit is inhibited from forcing of the soft-start voltage reference value to the value representing the output voltage of the power converter plus a specified offset when the output current is below a specified over-current threshold.

20. The DC-to-DC power supply circuit of claim 13, wherein the target voltage generator circuit is inhibited from forcing of the soft-start voltage reference value to the value representing the output voltage of the power converter plus a specified offset when the output current is below a specified over-current threshold.

* * * * *